(12) United States Patent
Zhang et al.

(10) Patent No.: US 11,347,281 B2
(45) Date of Patent: May 31, 2022

(54) DEVICE FOR FIXING HARD DISK

(71) Applicant: ZHENGZHOU YUNHAI INFORMATION TECHNOLOGY CO., LTD., Henan (CN)

(72) Inventors: Wenda Zhang, Henan (CN); Wenhan Xu, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 381 days.

(21) Appl. No.: 16/475,118

(22) PCT Filed: Dec. 25, 2018

(86) PCT No.: PCT/CN2018/123479
§ 371 (c)(1),
(2) Date: Jun. 30, 2019

(87) PCT Pub. No.: WO2019/242269
PCT Pub. Date: Dec. 26, 2019

(65) Prior Publication Data
US 2021/0333844 A1    Oct. 28, 2021

(30) Foreign Application Priority Data

Jun. 21, 2018    (CN) .......................... 201810643509.6

(51) Int. Cl.
*G11B 33/12*    (2006.01)
*G11B 33/04*    (2006.01)
(Continued)

(52) U.S. Cl.
CPC .............. *G06F 1/187* (2013.01); *G11B 33/02* (2013.01); *G11B 33/04* (2013.01);
(Continued)

(58) Field of Classification Search
None
See application file for complete search history.

(56) References Cited

U.S. PATENT DOCUMENTS 5,566,383 A * 10/1996 Gildea ................... G06F 1/184
6,058,016 A *  5/2000 Anderson ............... G06F 1/184
                                                        312/223.2
(Continued)

FOREIGN PATENT DOCUMENTS

CN    201051235 Y    4/2008
CN    201348754 Y    11/2009
(Continued)

OTHER PUBLICATIONS

The 1st Office Action dated Aug. 2, 2019 regarding the Chinese priority patent application No. CN201810643509.6.
(Continued)

*Primary Examiner* — Jefferson A Evans
(74) *Attorney, Agent, or Firm* — Yue (Robert) Xue; Apex Attorneys at Law, LLP

(57) ABSTRACT

A device for fixing a hard disk is provided, which is arranged in a case and can install multiple hard disks at one time. The device for fixing a hard disk includes fixing brackets and an elastic support member. The elastic support member is arranged between two adjacent fixing brackets. The number of the fixing bracket is even, and the fixing brackets are arranged in symmetry. The hard disk is placed between the elastic support member and one single fixing bracket, which can quickly and conveniently realize the fixing and installation of the hard disk, save a lot of space, and can be arranged in array in the case. The device has high reliability and good shock absorption effects. When the space of the case is limited, the demand of high-density storage configuration can also be achieved.

9 Claims, 3 Drawing Sheets

(51) Int. Cl.
G06F 1/18 (2006.01)
G11B 33/02 (2006.01)

(52) U.S. Cl.
CPC ...... G11B 33/0461 (2013.01); G11B 33/0466 (2013.01); G11B 33/125 (2013.01); G11B 33/128 (2013.01)

(56) References Cited

U.S. PATENT DOCUMENTS

| | | | |
|---|---|---|---|
| 6,339,532 | B1 | 1/2002 | Boulay et al. |
| 9,134,754 | B2* | 9/2015 | Guo .................. G06F 1/187 |
| 10,768,675 | B1* | 9/2020 | Ni .................... H05K 7/1487 |
| 10,782,748 | B1* | 9/2020 | Tsorng ............... G06F 1/187 |
| 2005/0141189 | A1 | 6/2005 | Chen et al. |
| 2006/0130085 | A1* | 6/2006 | Korikawa ........... G11B 33/126 |
| | | | 720/657 |
| 2009/0294606 | A1* | 12/2009 | Chen ................. G06F 1/187 |
| | | | 312/223.2 |
| 2010/0163698 | A1 | 7/2010 | Yeh et al. |
| 2013/0220952 | A1* | 8/2013 | Zhou .................. G11B 33/128 |
| | | | 211/26 |
| 2013/0342988 | A1 | 12/2013 | Peng et al. |
| 2014/0285977 | A1* | 9/2014 | Li ..................... G11B 33/128 |
| | | | 361/747 |
| 2014/0374366 | A1* | 12/2014 | Tsai ................... G11B 33/00 |
| | | | 211/26 |
| 2015/0359115 | A1* | 12/2015 | Hirano ............... G11B 33/128 |
| | | | 361/679.34 |
| 2015/0382494 | A1* | 12/2015 | Hu .................... G06F 1/1658 |
| | | | 248/314 |
| 2017/0228000 | A1* | 8/2017 | Yang .................. G11B 33/128 |
| 2019/0325917 | A1* | 10/2019 | Chang ................ G11B 33/124 |
| 2021/0092861 | A1* | 3/2021 | Yu .................... F16M 11/10 |

FOREIGN PATENT DOCUMENTS

| | | |
|---|---|---|
| CN | 103513722 A | 1/2014 |
| CN | 206657300 U | 11/2017 |
| CN | 107505996 A | 12/2017 |
| CN | 207264268 U | 4/2018 |
| CN | 108563303 A | 9/2018 |

OTHER PUBLICATIONS

International Search Report for PCT/CN2018/123479 dated Apr. 2, 2019, ISA/CN.

* cited by examiner

DEVICE FOR FIXING HARD DISK

The present application is the National phase of International Application No. PCT/CN2018/123479, titled "DEVICE FOR FIXING HARD DISK", filed on Dec. 25, 2018, which claims the priority to Chinese patent application No. 201810643509.6 titled "DEVICE FOR FIXING HARD DISK", filed with the China National Intellectual Property Administration on Jun. 21, 2018, the entire disclosures of the applications are incorporated herein by reference.

FIELD

The present application relates to the technical field of telecommunication, and in particular to a device for fixing a hard disk.

BACKGROUND

With the gradual popularization of the network, the amount of data transmitted by the network tends to be huge, and the problem of data storage has become the primary problem. The emergence of hard disks solves the problem of data storage. In order to meet the requirements of high-speed computing, the disk array architecture is generally adopted, so as to increase the amount of data storage and improve the data access speed. However, hard disks inside a server are generally fixed by various forms of hard disk trays or brackets, theses hard disk trays or brackets occupy the case space and impose restrictions on the high-density storage layout. The hard disks often need maintenance, and need manual disassembly and assembly for manual maintenance. The number of hard disks in the high-density storage layout is often large, thus how to quickly and easily disassemble and assemble the hard disks is a key issue to be considered in the design of mechanism.

SUMMARY

Aiming at the disadvantages of the conventional technology, a device for fixing a hard disk is provided according to the present application, which can not only ensure reliable fixing, quick disassembly and assembly, but also realize the high-density storage layout.

The technical solution of the present application for solving the technical problems is as follows. A device for fixing a hard disk is provided according to the present application, which is arranged in a case and can mount multiple hard disks at one time. The device for fixing a hard disk includes fixing brackets and an elastic support member. The elastic support member is arranged between two adjacent fixing brackets. The number of the fixing brackets is even, and the fixing brackets are arranged in symmetry. The hard disk is placed between the elastic support member and a corresponding fixing bracket.

Further, the fixing bracket has an L-shaped sheet metal structure. A first blind rivet for connecting with a base of the case is installed on a horizontal plane of the L-shaped sheet metal. A second blind rivet for connecting with a side wall of the case or an adjacent fixing bracket is installed on a vertical plane of the L-shaped sheet metal and first positioning posts are riveted on the vertical plane, and the first positioning posts face toward the elastic support member.

Further, the elastic support member includes two auxiliary brackets, two elastic-piece brackets and a sheet metal handle. Both the two elastic-piece brackets are arranged between the two auxiliary brackets, the sheet metal handle is mounted onto one of the auxiliary brackets, and the sheet metal handle can be pressed between the two elastic-piece brackets.

Further, a bent wall is provided on the auxiliary bracket.

Further, a third blind rivet for connecting with the base of the case is arranged on a horizontal plane of the auxiliary bracket, and a fourth blind rivet for connecting with the elastic-piece bracket is arranged on the vertical plane of the auxiliary bracket Further, each of the elastic-piece brackets is an L-shaped stainless steel sheet metal with a pre-folded structure, a fifth blind rivet is arranged on a horizontal plane of the L-shaped stainless steel sheet metal, and second positioning posts are riveted on a vertical plane of the L-shaped stainless steel sheet metal, and the second positioning posts face toward a corresponding fixing bracket.

Further, the vertical plane of the elastic-piece bracket is angled relative to the horizontal plane, and is not perpendicular to the horizontal plane.

Further, a semi-rolled circle structure is provided on the vertical plane of the elastic-piece bracket.

Further, the sheet metal handle has a sheet metal structure which is folded flat, a bump is arranged on the sheet metal handle, and a support wall is provided on the sheet metal handle to be in contact with and be supported by the base of the case.

Further, shock absorbing rubber sheets are bonded to the fixing brackets, the auxiliary brackets and the elastic-piece brackets.

The hard disk can be installed and fixed by the device for fixing a hard disk in the following ways.

When installing multiple hard disks, first the sheet metal handle is lifted, two hard disks are loaded in turn, and then the sheet metal handle is pressed down. At this time, the elastic-piece bracket is deformed toward the hard disk on the same side, and the first positioning posts are inserted into screw holes on one side of the hard disk for fixing and installing the hard disk. Other hard disks can be similarly installed in sequence.

When installing a single hard disk, first one side of the hard disk is hooked to the fixing bracket, and then the hard disk is pressed down and the other is hooked to the elastic-piece bracket. The shock absorbing rubber sheets bonded on the fixing bracket, the auxiliary bracket and the elastic-piece bracket are attached to a bottom or sides of the hard disk to provide a shock absorbing effect. When the sheet metal handle is pressed down into place, the case is covered by an upper cover, and the sheet metal handle is pressed against the upper cover to prevent the sheet metal handle from bouncing.

The effect provided in the summary of the application is only the effects of the embodiments, not all of the effects of the application. The above technical solution has the following advantages or beneficial effects.

1. The device for fixing a hard disk places the hard disk between the elastic support member and a single fixing bracket by arranging the fixing brackets and the elastic support member, which can quickly and conveniently realize the fixing and installation of the hard disk, save a lot of space, and can be arranged in array in the case. The device has high reliability and good shock absorption effects. When the space of the case is limited, the demand of high-density storage configuration can also be achieved.

2. The fixing brackets and the elastic support member according to the present application are L-shaped sheet metal, which have the advantages of light weight, high strength, electrical conductivity and low cost, and are suitable for large-scale mass production, and greatly saves the manpower and material resources for manufacturing the device, so that the present application is more feasible and practical.

3. The shock absorbing rubber sheets are bonded to areas where the fixing brackets, the auxiliary brackets and the elastic-piece brackets contact with the hard disk to reduce the influence of external vibrations on the hard disk and better protect the hard disk.

Figure 1:
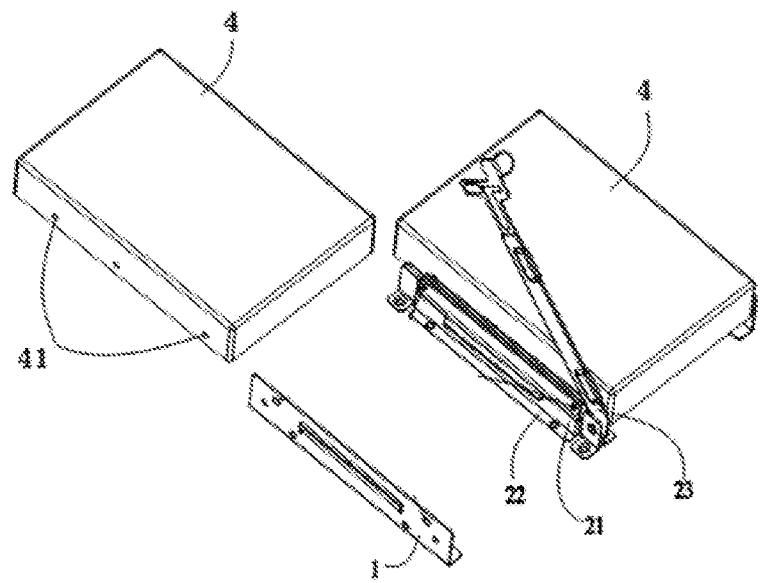
FIG. 1 is a schematic structural view of a hard disk mounted in a case according to the present application.
Figure 2:
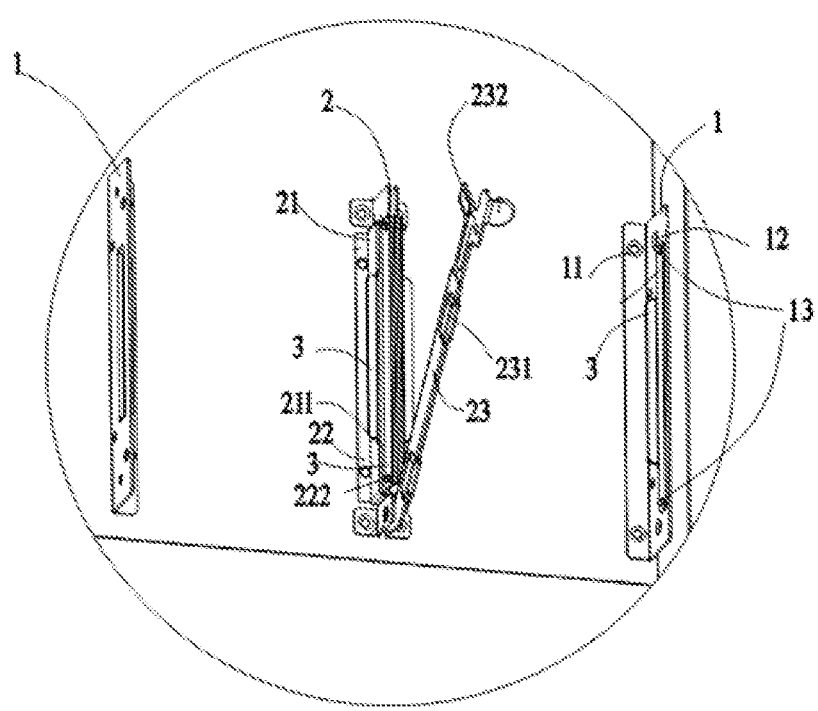
FIG. 2 is a schematic structural view of a device for fixing a hard disk according to the present application.
Figure 3:
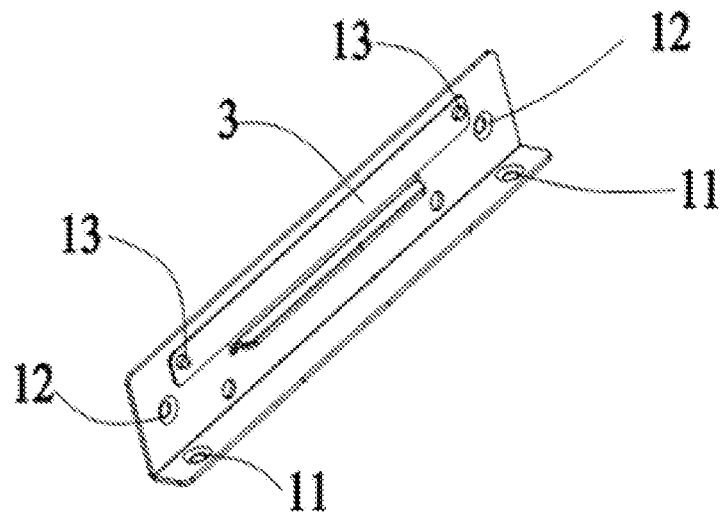
FIG. 3 is a schematic structural view of a fixing bracket according to the present application.
Figure 4:
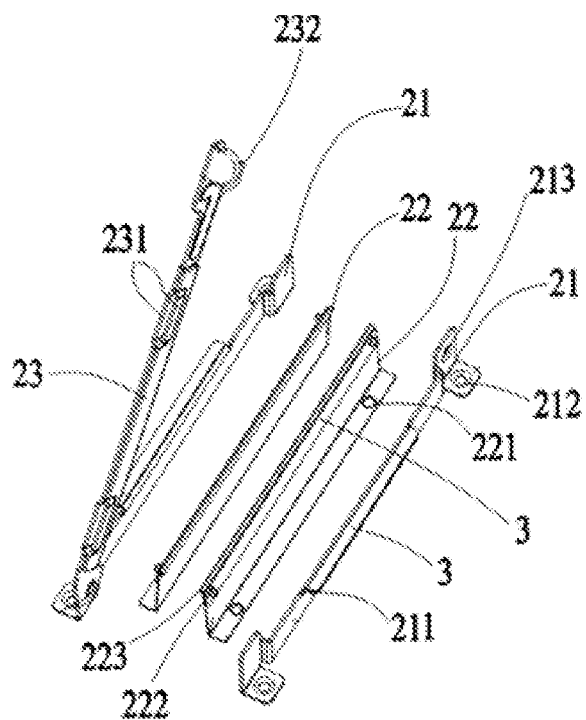
FIG. 4 is a schematic structural view of an elastic support member according to the present application.
Figure 5:
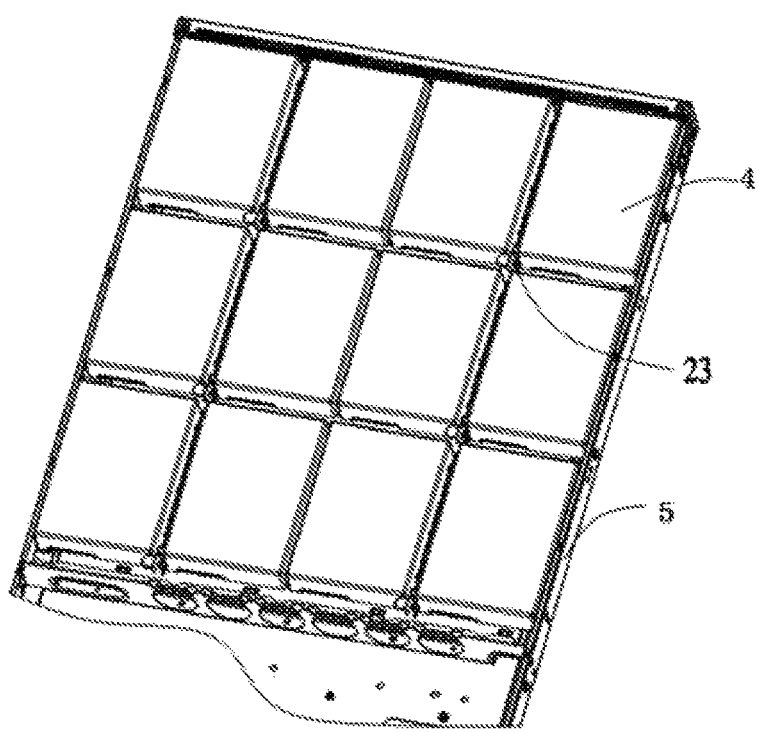
FIG. 5 is a schematic view of a high-density storage layout using the device for fixing a hard disk according to the present application.

| Reference numerals in FIGS. 1 to 5: | |
| --- | --- |
| 1 fixing bracket | 11 first blind rivet |
| 12 second blind rivet | 13, first positioning post |
| 2 elastic support member | 21 auxiliary bracket |
| 211 bending wall | 212 third blind rivet |
| 213 fourth blind rivet | 22 elastic-piece bracket |
| 221 fifth blind rivet | 222 second positioning post |
| 223 semi-rolled circle | 23 sheet metal handle |
| 231 bump | 232 support wall |
| 3 shock absorbing rubber sheet | 4 hard disk |
| 41 screw hole | 5 case. |

DETAILED DESCRIPTION OF EMBODIMENTS

In order to illustrate the technical features of the present solution clearly, the present application is described in detail hereinafter with reference to the specific embodiments and the drawings. The following disclosure provides a number of different embodiments or examples for implementing different structures of the present disclosure. In order to simplify the disclosure of the present application, components and arrangement of specific examples are described below. Besides, same reference numerals and/or letters are used in different examples of the present application. This repetition is for simplicity and clarity, which does not indicate a relationship between the various embodiments and/or arrangements described. It should be noted that the components shown in the drawings are not necessarily drawn to scale. The description of the known components and processing techniques and processes is omitted to avoid unnecessary restrictions on the present application.

FIGS. 1 to 5 show an embodiment of the present application. As shown in the figures, a device for fixing a hard disk is arranged in a case 5 and can mount multiple hard disks 4 at one time. The device includes fixing brackets 1 and an elastic support member 2. The elastic support member 2 is arranged between two adjacent fixing brackets 1. The number of the fixing brackets 1 is even and the fixing brackets are arranged in symmetry. The hard disk 4 is placed between the elastic support member 2 and one single fixing bracket 1. The embodiment of the present application can quickly and conveniently realize the fixing and installation of the hard disk, save a lot of space, and can be arranged in array in the case. The device has high reliability and good shock absorption effects. When the space of the case is limited, the demand of high-density storage configuration can also be achieved.

The fixing bracket 1 has an L-shaped sheet metal structure, a horizontal plane of the L-shaped sheet metal is provided with a first blind rivet 11 for being fixed to a base of the case 5 by riveting, and a vertical plane thereof is provided with a second blind rivet 12 for being fixed to a side wall of the case 5 or an adjacent fixing bracket 1 by riveting. First positioning posts 13 are riveted on the vertical plane. The first positioning posts 13 face toward the elastic support member 2. When the hard disk is installed, the first positioning posts 13 are inserted into screw holes 41 on a side of the hard disk 4 to limit and fix the hard disk 4.

The elastic support member 2 includes two auxiliary brackets 21, two elastic-piece brackets 22 and a sheet metal handle 23. Both the two elastic-piece brackets 22 are arranged between the two auxiliary brackets 21. The sheet metal handle 23 is installed on one auxiliary bracket 21, and the sheet metal handle 23 can be pressed between the two elastic-piece brackets 22. The sheet metal handle 23 is fixed to the auxiliary bracket 21 through a blind rivet, which allows the sheet metal handle 23 to rotate around an axis of the blind rivet. The sheet metal handle 23 can be pressed between the two elastic-piece brackets 22, so that both the left and right elastic-piece brackets 22 are deformed at the same time, and the deformation enlarges the distance between the left and right elastic-piece brackets 22, while the distance between the elastic-piece bracket 22 and the fixing bracket 1 on the corresponding side is reduced, thereby clamping and fixing the hard disk 4. The positioning and fixing of the hard disk are realized by the fixing bracket 1 and the first positioning posts 13 on the elastic-piece bracket 22 located on a same side. The auxiliary bracket 21 is provided with a bending wall 211 for supporting the hard disk. A third blind rivet 212 for connecting with the base of the case 5 is provided on a horizontal plane of the auxiliary bracket 21, and a fourth blind rivet 213 for connecting with the elastic-piece bracket 22 is provided on the vertical plane. The elastic-piece bracket 22 is an L-shaped stainless steel sheet metal with a pre-folded structure. A fifth blind rivet 221 for riveting and fixing with the base of the chasses is installed on the horizontal plane of the L-shaped stainless steel sheet metal, and second positioning posts 222 are riveted on the vertical plane of the L-shaped stainless steel sheet metal, and the second positioning posts 222 face toward the fixing bracket 1. After the hard disk is installed, the second positioning posts 222 are inserted into the screw holes 41 on the other side of the hard disk 4. The vertical plane of the elastic-piece bracket 22 is angled relative to the horizontal plane and not perpendicular to the horizontal plane, and has a pre-bending deformation with a certain angle and is inclined to the elastic-piece bracket on the opposite side. A semi-rolled circle structure 223 is provided on the vertical plane of the elastic-piece bracket 22 to reduce the resistance when the semi-rolled circle structure is in contact with the sheet metal handle 23, so that the sheet metal handle 23 can be smoothly pressed and lifted. The sheet metal handle 23 has a sheet metal structure which is folded flat, and a bump 231 is arranged on the sheet metal handle 23. When the sheet metal handle 23 is pressed down, the bump 231 is squeezed between the two elastic-piece brackets 22, so that the elastic-piece brackets are deformed toward the auxiliary brackets 21 on the corresponding side, respectively. A support wall 232 is provided on the sheet metal handle 23 to be in contact with and be supported by the base of the case 5. Shock absorbing rubber sheets 3 are bonded to the fixing brackets 1, the auxiliary brackets 21 and the elastic-piece brackets 22 to reduce the influence of external vibrations on the hard disk.

The hard disk 4 can be installed and fixed by the device for fixing a hard disk in the following ways:

When installing multiple hard disks 4, first the sheet metal handle 23 is lifted, two hard disks 4 are loaded in turn, and then the sheet metal handle 23 is pressed down. At this time, the elastic-piece bracket 22 is deformed toward the hard disk 4 on the same side, and the first positioning posts 13 are inserted into the screw holes 41 on one side of the hard disk 4 for fixing and installing the hard disk. Other hard disks can be similarly installed in sequence.

When installing a single hard disk 4, first one side of the hard disk 4 is hooked to the fixing bracket 1, and then the hard disk 4 is pressed down and the other side of the hard disk is hooked to the elastic-piece bracket 22. The shock absorbing rubber sheets 3 bonded on the fixing bracket 1, the auxiliary bracket 21 and the elastic-piece bracket 22 are attached to a bottom or sides of the hard disk 4 to provide a shock absorbing effect. When the sheet metal handle 23 is pressed down into place, the case 5 is covered by an upper cover, and the sheet metal handle 23 is attached to the upper cover to prevent the sheet metal handle 23 from bouncing.

The specific embodiment of the present application is described with reference to the drawings, but it is not intended to limit the scope of the present application. On the basis of the technical solutions of the present application, various modifications or variations that can be made by those skilled in the art without any creative effort are still within the scope of the present application.

The invention claimed is:

1. A device for fixing a hard disk, arranged in a case and configured to install a plurality of hard disks at one time, wherein the device comprises fixing brackets and an elastic support member, the elastic support member is arranged between two adjacent fixing brackets and is parallel to the fixing brackets, the number of the fixing brackets is even, the fixing brackets are arranged in symmetry, and the hard disk is placed between the elastic support member and a corresponding fixing bracket, the elastic support member comprises two auxiliary brackets, two elastic-piece brackets and a sheet metal handle, both the two elastic-piece brackets are arranged between the two auxiliary brackets, the sheet metal handle is arranged on one of the auxiliary brackets, and the sheet metal handle is configured to be pressed between the two elastic-piece brackets.

2. The device for fixing a hard disk according to claim 1, wherein each of the fixing brackets is an L-shaped sheet metal structure, a first blind rivet is arranged on a horizontal plane of the L-shaped sheet metal, a second blind rivet is arranged on a vertical plane of the L-shaped sheet metal, first positioning posts are riveted on the vertical plane of the L-shaped sheet metal, and the first positioning posts face toward the elastic support member.

3. The device for fixing a hard disk according to claim 1, wherein a bent wall is provided on each of the auxiliary brackets.

4. The device for fixing a hard disk according to claim 1, wherein a third blind rivet configured to connect with a base of the case is arranged on a horizontal plane of each of the auxiliary brackets, and a fourth blind rivet configured to connect with the elastic-piece brackets is arranged on a vertical plane of each of the auxiliary brackets.

5. The device for fixing a hard disk according to claim 1, wherein each of the elastic-piece brackets is an L-shaped stainless steel sheet metal with a pre-folded structure, a fifth blind rivet is arranged on a horizontal plane of the L-shaped stainless steel sheet metal, second positioning posts are riveted on a vertical plane of the L-shaped stainless steel sheet metal, and the second positioning posts face toward the corresponding fixing bracket.

6. The device for fixing a hard disk according to claim 5, wherein the vertical plane of each of the elastic-piece brackets is angled and not perpendicular to the horizontal plane of each of the elastic-piece brackets.

7. The device for fixing a hard disk according to claim 5, wherein a semi-rolled circle structure is provided on the vertical plane of each of the elastic-piece brackets.

8. The device for fixing a hard disk according to claim 1, wherein the sheet metal handle is a sheet metal structure which is folded flat, a bump is arranged on the sheet metal handle, and a support wall is provided on the sheet metal handle to be in contact with and be supported by the base of the case.

9. The device for fixing a hard disk according to claim 1, wherein shock absorbing rubber sheets are bonded to the fixing brackets, the auxiliary brackets and the elastic-piece brackets.

* * * * *